US009191044B1

(12) United States Patent
Sun et al.

(10) Patent No.: US 9,191,044 B1
(45) Date of Patent: Nov. 17, 2015

(54) METHODS AND APPARATUS FOR MULTIPLE INPUT MULTIPLE OUTPUT (MIMO) SUCCESSIVE INTERFERENCE CANCELLATION (SIC)

(71) Applicant: Marvell International Ltd., Hamilton (BM)

(72) Inventors: Yakun Sun, Sunnyvale, CA (US); Jungwon Lee, San Diego, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/142,291

(22) Filed: Dec. 27, 2013

Related U.S. Application Data

(63) Continuation of application No. 13/164,111, filed on Jun. 20, 2011, now Pat. No. 8,630,379.

(60) Provisional application No. 61/357,875, filed on Jun. 23, 2010.

(51) Int. Cl.
*H04B 1/10* (2006.01)
*H04B 7/04* (2006.01)

(52) U.S. Cl.
CPC ............... *H04B 1/10* (2013.01); *H04B 7/0456* (2013.01)

(58) Field of Classification Search
CPC ................................ H04B 15/00; H04L 17/00
USPC .......................................... 375/261, 267, 316
See application file for complete search history.

(56) References Cited

U.S. PATENT DOCUMENTS

| | | | |
|---|---|---|---|
| 7,209,522 B1 | 4/2007 | Shirali | |
| 8,072,899 B2 | 12/2011 | Pan et al. | |
| 2005/0075073 A1* | 4/2005 | Kadous et al. | 455/63.1 |
| 2007/0230382 A1* | 10/2007 | Ding et al. | 370/310 |
| 2008/0279298 A1* | 11/2008 | Ben-Yishai et al. | 375/261 |
| 2009/0325591 A1* | 12/2009 | Liu et al. | 455/452.2 |
| 2010/0002598 A1 | 1/2010 | Pan et al. | |
| 2010/0034308 A1* | 2/2010 | Kim et al. | 375/267 |
| 2010/0271988 A1 | 10/2010 | Jia et al. | |
| 2012/0069757 A1 | 3/2012 | Jiang et al. | |

* cited by examiner

*Primary Examiner* — Jaison Joseph

(57) ABSTRACT

Systems and methods are provided for determining a successive interference cancellation (SIC) decoding ordering in a multiple input multiple output transmission (MIMO) system. Multiple decoding orderings for received codewords are identified. A performance objective, such as total throughput or total probability of decoding, is computed for each one of the orderings based on the position of the codewords in the ordering. A globally optimal ordering is found that maximizes the performance objective over the multiple decoding orderings.

20 Claims, 9 Drawing Sheets

(12) United States Patent
Lee et al.

(10) Patent No.: US 9,191,044 B1
(45) Date of Patent: *Nov. 17, 2015

METHODS AND APPARATUS FOR MULTIPLE INPUT MULTIPLE OUTPUT (MIMO) SUCCESSIVE INTERFERENCE CANCELLATION (SIC)

CROSS-REFERENCE TO RELATED APPLICATIONS

This application is a continuation of U.S. patent application Ser. No. 13/164,111, filed Jun. 20, 2011, (now U.S. Pat. No. 8,630,379), which claims benefit under 35 U.S.C. §119 (e) of U.S. Provisional Application No. 61/357,875, filed Jun. 23, 2010, each of which is hereby incorporated herein by reference in its entirety.

BACKGROUND OF THE INVENTION

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

The disclosed technology relates to communication systems, and more particularly, to performing successive interference cancellation (SIC) in multiple input multiple output (MIMO) systems.

In a data transmission system, it is desirable for information, often grouped into packets, to be accurately received at a destination. A transmitter at or near the source sends the information provided by the source via a signal or signal vector. A receiver at or near the destination processes the signal sent by the transmitter. The medium, or media, between the transmitter and receiver, through which the information is sent, may corrupt the signal such that the receiver is unable to correctly reconstruct the transmitted information. Therefore, given a transmission medium, sufficient reliability is obtained through careful design of the transmitter and/or receiver, and of their respective components.

Successive interference cancellation (SIC) is one technique for improving the performance of a data transmission system. According to this technique, a received codeword that is associated with strong channel conditions is decoded before other codewords that are associated with weak channel conditions. Effects of the decoded codeword are subtracted from a received signal vector to eliminate interference due to the decoded codeword from the other codewords. In this way, the other codewords may experience less interference and are able to achieve a higher Signal-to-Noise Ratio (SNR) than without interference cancellation.

The order in which codewords are decoded may have an important impact on the SIC performance. Conventional SIC methods decode codewords in an order that is based on channel parameters (e.g., channel quality) associated with each codeword. These conventional approaches provide a locally optimal decoding order because such approaches select, at each decoding stage, a best codeword for that stage. Furthermore, these approaches operate on the assumption of perfect interference cancellation, which is not always true. However, a codeword that is locally optimal at a given decoding stage may not guarantee the largest interference cancellation gain for the remaining codewords.

SUMMARY OF THE INVENTION

In view of the foregoing, systems and methods are provided for performing successive interference cancellation (SIC) in a multiple input multiple output transmission (MIMO) system.

In some embodiments, a plurality of SIC decoding orderings of received codewords is identified. Each ordering of the plurality of orderings defines a unique order of the codewords for decoding using SIC. For each ordering of the plurality of orderings, a performance objective may be computed based on a position of each codeword in each ordering. An optimal ordering is determined that maximizes the performance objective over the plurality of orderings.

In some implementations, the performance objective may be evaluated by computing, for each ordering of the plurality of orderings, a performance component for each codeword based on a position of the codeword in the ordering.

BRIEF DESCRIPTION OF THE FIGURES

The above and other aspects and potential advantages of the present disclosure will be apparent upon consideration of the following detailed description, taken in conjunction with the accompanying drawings, in which like reference characters refer to like parts throughout, and in which.

DETAILED DESCRIPTION OF THE INVENTION

The present disclosure generally relates to performing successive interference cancellation (SIC) in a multiple input multiple output transmission (MIMO) system. In one aspect, a plurality of SIC orderings of received codewords is determined. A performance objective, such as total throughput or total probability of decoding, is computed for each one of the orderings based on the position of the codewords in the ordering. For example, performance components are computed for each one of the codewords in each one of the orderings. A globally optimal ordering is found that maximizes the performance objective over the plurality of orderings. The complexity of finding the globally optimal ordering may be decreased using various techniques, such as a tree representation.

Figure 1:
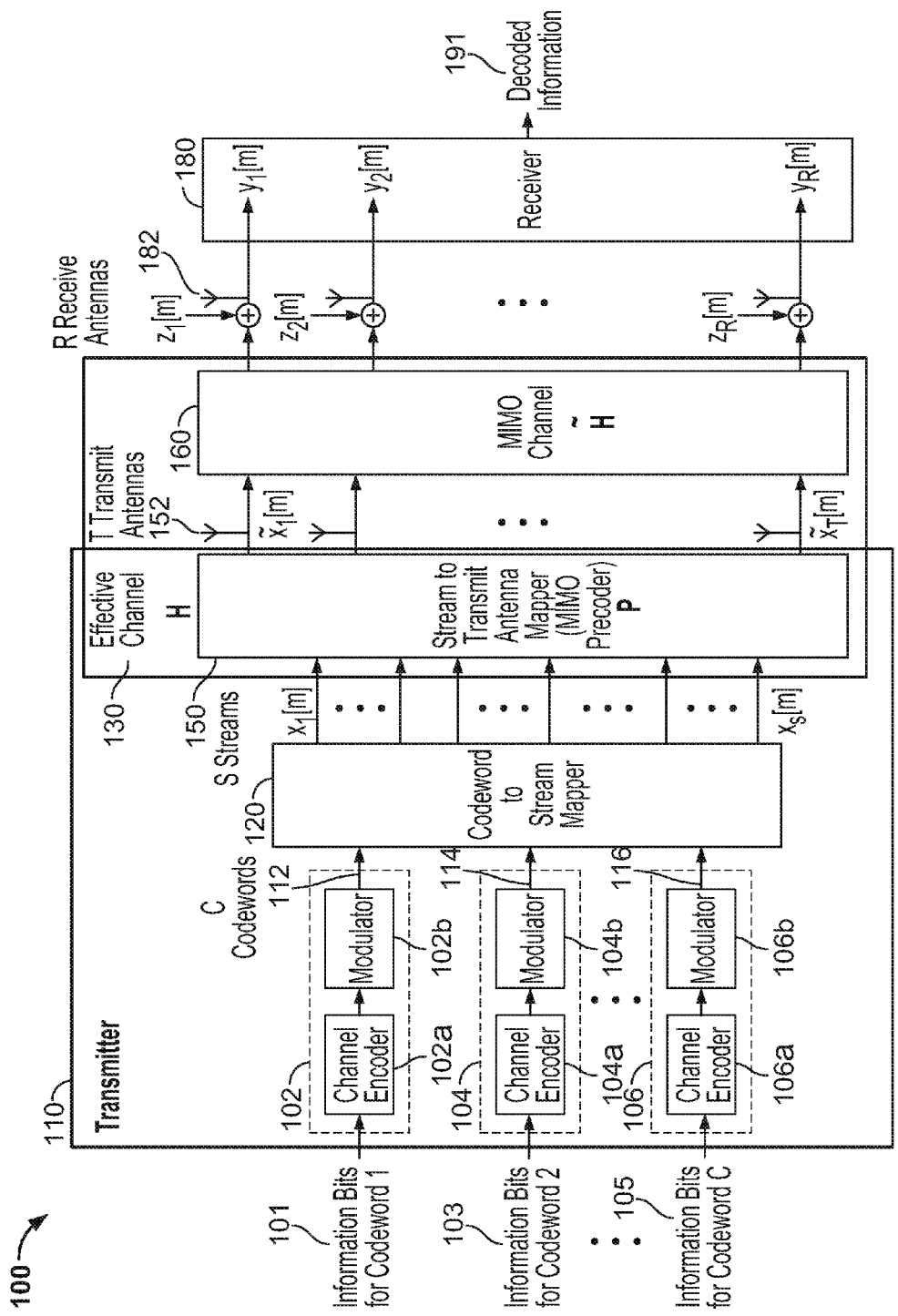
FIG. 1 is a high level block diagram of a data transmission system in accordance with embodiments of the present disclosure.

FIG. 1 shows an illustration of a data transmission system 100 in accordance with some embodiments. The system of FIG. 1 includes transmitter 110, channel 160, and receiver 180. In some embodiments, data to be transmitted may be divided between a large number of transmission systems such as system 100, where each system corresponds to one parallel transmission. For example, system 100 may correspond to one subcarrier that carries data in a particular frequency range, or a tone. In some embodiments, the illustrated system may represent a wireless communication system. In these embodiments, transmitter 110 may be a wireless router and receiver 180 may be a wireless receiver, such as a mobile telephone, computer, laptop, hand held device, or other such device. The components shown in transmitter 110 and receiver 180 may be implemented by a single integrated circuit (IC) or as separate components in a circuit board or implemented on a programmable logic device. These components may be implemented on separate devices or circuits and networked together.

Transmitter 110 may process C information bit sequences to produce C codewords using encoder and modulator blocks. For example, encoder and modulator blocks 102, 104, and 106 may process bit sequences 101, 103, and 105, to output codewords 112, 114, and 116, respectively. Although the present disclosure is described in terms of binary data, the bit sequences 101, 103, and 105 may be replaced with a sequence of non-binary digits or another type of information-containing symbol without departing from the scope of the present disclosure. In some embodiments, encoder and modulator blocks 102, 104, and 106 may include encoders 102a, 104a, and 106a respectively, e.g., that employ error correction or error detection codes to encode bit sequences 101, 103, and 105. For example, encoders 102a, 104a, and 106a may encode bit sequences 101, 103, and 105 using CRC code, convolutional code, Turbo code, LDPC code, or any other suitable code. Encoder and modulator blocks 102, 104, and 106 may additionally include modulators 102b, 104b, and 106b respectively, to modulate the encoded bit sequences of bit sequences 101, 103 and 105 based on any appropriate modulation scheme, such quadrature amplitude modulation (QAM), pulse amplitude modulation (PAM), or phase shift keying (PSK). Although encoder and modulator blocks 102, 104, and 106 are illustrated as separate blocks, the blocks may be implemented as one or multiple encoder and modulator units.

Codeword to stream mapper 120 may process the C codewords output by the encoder and modulator blocks (e.g., encoder and modulator blocks 112, 114, and 116) to output S streams. These S streams are represented by coded values $x_1[m]$ through $x_s[m]$, where m is a transmission index associated with a transmission instance. A transmission instance may be defined in time domain or frequency domain or any combination thereof. In some embodiments, m may refer to the index of symbols sent in the time domain. In some embodiments, m may represent the index of subcarriers (i.e., m=1 indexes a stream that is transmitted first, e.g., by a first subcarrier and m=2 indexes a stream that is transmitted second by a second, possibly different, subcarrier). All S streams $x_1[m]$ through $x_s[m]$ may be collectively referred to as a S×1 stream vector x(m) such that:

$$x(m)=[x_1[m], \ldots ,x_s[m]]^T.$$

Streams $x_1[m]$ through $x_s[m]$ may be input into MIMO precoder 150. MIMO precoder 150 may map stream $x_1[m]$ through $x_s[m]$ to transmit values $\tilde{x}_1[m]$ through $\tilde{x}_T[m]$, where T is the number of transmit antennas (T≥S). These transmit values may be grouped in a T×1 vector $\tilde{x}(m)$, which will be referred to hereinafter as transmit vector $\tilde{x}(m)$ where:

$$\tilde{x}(m)=[\tilde{x}_1[m], \ldots ,\tilde{x}_T[m]]^T.$$

This mapping from stream vector x to transmit vector $\tilde{x}$ may be performed using a linear precoding operation. For example, MIMO precoder 150 may generate transmit vector $\tilde{x}$ by multiplying stream vector $\tilde{x}$ by a T×S precoding matrix P, such that:

$$\tilde{x}(m)=P(m)x(m). \tag{EQ. 1}$$

Precoding matrix P may be chosen to implement certain transmission schemes. In some embodiments, precoding matrix P may be selected such that multiple copies of the same data stream $x_1[m]$ are sent across a number of transmit antennas to improve the reliability of data transfer. This redundancy results in a higher chance of being able to use one or more of the received copies to reconstruct the transmitted signals at the receiver.

Transmit values $\tilde{x}_1[m]$ through $\tilde{x}_1[m]$ may be transmitted using T transmit antennas through channel 160 and received by R receiver antennas at receiver 180. For example, $\tilde{x}_1[m]$ may be transmitted through transmit antenna 152. During transmission, $\tilde{x}_1[m]$ through $\tilde{x}_T[m]$ may be altered by a transmission medium, represented by channel 160, and additive noise sources $z_1[m]$ through $z_R[m]$. In a wireless communication system channel 160 may be the physical space between the transmit and receiver antennas, which obstructs and attenuates the transmitted signals due to at least time varying multipath fades and shadowing effects. Additive noise sources $z_1[m]$ through $z_R[m]$ may, for example, be ambient electromagnetic interference. In some scenarios, noise sources $z_1[m]$ through $z_R[m]$ may be modeled as additive white Gaussian noise (AWGN) with zero mean. Also, in many applications, channel 160 may be time invariant, meaning that the properties of the channel do not substantially change over an appropriate time scale. In real time data transmission systems, an appropriate time scale may be in the millisecond range.

Receiver 180 may receive signals $y_1[m]$ through $y_R[m]$ using R receiver antennas such as receiver antenna 182. These received signals will be collectively referred to as the $m^{th}$ received vector y(m), or simply the received vector y, where:

$$y(m)=[y_1[m], \ldots ,y_R[m]]^T.$$

Receiver 180 may include any suitable number of receiver antennas, and therefore R may be any integer of at least one. Signals $y_1[m]$ through $y_R[m]$ may include information from one or more of signals $\tilde{x}_1[m]$ through $\tilde{x}_T[m]$ that have been attenuated and/or corrupted by channel 160 and noise sources $z_1[m]$ through $z_R[m]$. Receiver 180 may process the received signals to produce output bit sequence 191. The processing done by receiver 180 may include demodulation and decoding. Alternatively, output bit sequence 191 may be directed to a decoder (not shown) external to receiver 180.

Because of the multiple transmit antennas of transmitter 110 and the possibly multiple receiver antennas of receiver 180, channel 160 may sometimes be referred to as a MIMO channel with T inputs (from transmitter 110) and R outputs (to receiver 180), or simply a T×R MIMO channel. Due to channel properties, the signal received by each of the R receiver antennas may be based on signals from multiple transmit antennas. In particular, a signal received by each receiver antenna may be a linear combination of the signals provided by the transmit antennas. Thus, in matrix form, the $m^{th}$ received vector r(m) can be modeled by:

$$y(m)=\tilde{H}(m)\tilde{x}(m)+z(m), m=1,\ldots,M \tag{EQ. 2}$$

where M is the total number of received coded symbol vectors, y is the R×1 received vector representing the signals received by the R receiver antennas of receiver 180, and $\tilde{H}$ is a T×R matrix representing the effect of channel 160 on transmit vector $\tilde{x}$, and may sometimes be referred to as a channel response matrix. Vector $\tilde{x}$ is a T×1 vector containing the transmit values transmitted by the T transmit antennas of transmitter 110, and z is an R×1 signal vector representing additive noise, where $z(m)=[z_1[m], \ldots, z_R[m]]^T$.

Substituting EQ. 1 into EQ. 2, one can compute an effective transmission channel relating the stream vector x to the received vector y as follows:

$$y(m)=\tilde{H}(m)P(m)x(m)+z(m)=H(m)x(m)+z(m),$$

where $\tilde{H}(m)$ represents the actual channel characteristics used in channel 160 and $H(m)=\tilde{H}(m)P(m)=[h_1[m], \ldots, h_S[m]]$ is a R×S matrix representing the effective transmission channel as modified by precoder 150. In some embodiments, the precoding matrix P can be chosen such that an effective transmission channel H(m) is created that maximizes the diversity gain of the system. For example, precoding matrix P may be chosen to change the apparent characteristics of the channel so that the effective channel matrix is more orthogonal than the actual channel matrix. Precoding matrix P may be a Givens rotation matrix, a Vandermonde matrix, a Fourier matrix, a Hadamard matrix or another type of matrix.

Each codeword, e.g., codeword 112, may be mapped to a set of streams $x_{i_1}[m]$ through $x_{i_{c(i)}}[m]$ (where c(i) denotes the total number of streams corresponding to codeword i, $1 \leq c(i) \leq S$). In other words, an $i^{th}$ codeword (equivalently codeword i, or codeword associated with index i) may be associated with a set of stream indices $S_i=\{i_1, i_2, \ldots, i_{c(i)}\}$, such that the stream vector $x_i(m)$ coming from the $i^{th}$ codeword is expressed as:

$$x_i(m)=[x_{i_1}[m], \ldots, x_{i_{c(i)}}[m]]^T.$$

Similarly, the channels corresponding to the $i^{th}$ codeword (alternatively codeword i) may be expressed using stream indices from the stream set $S_i$ as follows:

$$H_i(m)=[h_{i_1}[m], \ldots, h_{i_{c(i)}}[m]].$$

One technique for improving the performance of a MIMO system, e.g., of system 100 of FIG. 1, is to use successive interference cancellation (SIC). According to this technique, a codeword associated with strong channel conditions may be decoded first before other codewords associated with weaker channel conditions. Effects of this decoded codeword may be subtracted from a received signal vector, e.g., received vector y of FIG. 1, to eliminate interference of the decoded codeword on the other codewords.

SIC can be implemented in a number of ways. For example, SIC can be implemented such that all codewords are decoded in parallel, such that one codeword is serially decoded at each stage, or such that any arbitrary number of codewords is decoded simultaneously at each stage.

Techniques for implementing SIC are described, for example, in co-pending, commonly-assigned U.S. patent application Ser. No. 13/047,056, entitled "MULTIPLE-INPUT MULTIPLE-OUTPUT RECEIVERS USING SUCCESSIVE INTERFERENCE CANCELLATION BASED ON CYCLE REDUNDANCY CHECK", filed Apr. 2, 2010, which is hereby incorporated by reference herein in its entirety. Hereafter, and for the purposes of illustration, this disclosure will primarily discuss the serial SIC implementation. The systems and methods of this disclosure, however, may apply to other implementations of SIC. For example, any SIC implementation (e.g., serial or parallel) may use the SIC ordering generated using the techniques described herein.

Figure 2:
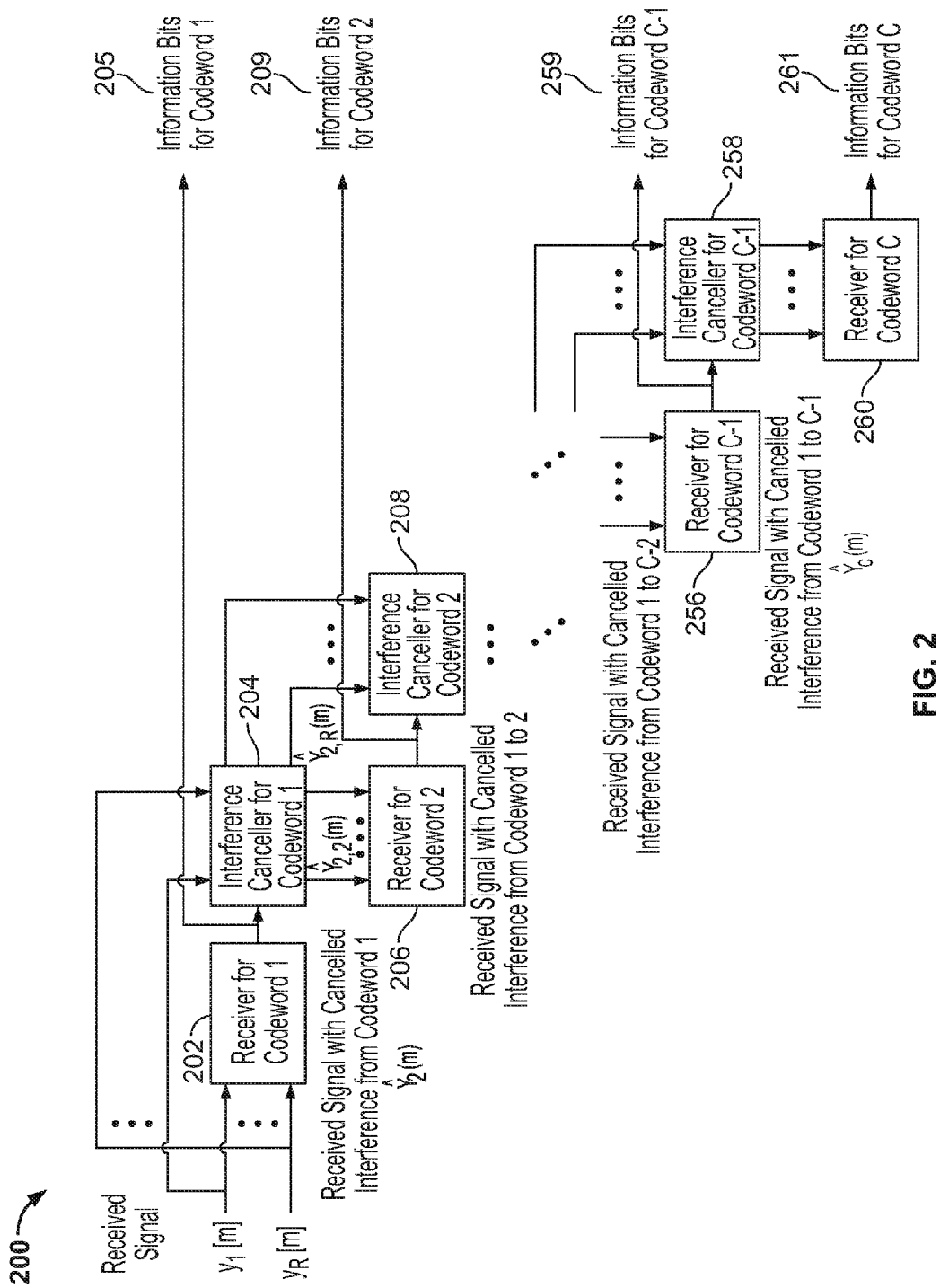
FIG. 2 is a high level block diagram of a successive interference cancellation (SIC) system in accordance with embodiments of the present disclosure.

FIG. 2 illustrates a block diagram of system 200 for performing SIC according to some embodiments. System 200 may include C decoding stages 1, 2, ..., C for respectively decoding codewords $L_1, L_2, \ldots, L_C$. For ease of illustration, only 4 of the stages are shown, and the stages are chosen to correspond, respectively, to codewords 1, 2, ..., C in that order (i.e., $L_1=1, L_2=2, \ldots, L_C=C$). However, any desired ordering of codewords may be used, as will be explained in further detail below.

Each stage (except the last stage) may include a receiver block for a codeword i and an interference canceller associated with that codeword i. For example, receiver block 202 and interference canceller 204 may correspond to the first stage associated with codeword 1, receiver block 206 and interference canceller 208 may correspond to the second stage associated with codeword 2, and receiver block 256 and interference canceller 258 may correspond to the C–$1^{th}$ stage associated with codeword C–1. The last stage may include a receiver block associated with codeword C and no interference canceller block, for example, receiver block 260. Although the receiver and interference canceller blocks of FIG. 2 are illustrated as separate blocks, the blocks may be implemented as one or multiple components by a single or multiple integrated circuit boards or devices.

At the first stage, receiver 202 may decode codeword 1 based on a received signal vector y, e.g., received signal vector y from FIG. 1, to generate decoded codeword 1. Interference canceller 204 may receive received signal vector y as well as the decoded codeword 1, as output by receiver 202. Interference canceller 204 may generate an interference-free received signal vector $\hat{y}_2$, where the interference due to codeword 1 is cancelled.

At the second stage, receiver 206 may decode codeword 2 based on the interference-free received signal vector $\hat{y}_2$ to generate decoded codeword 2. Interference canceller 208 may also receive $\hat{y}_2$ from interference canceller 204 as well as the decoded codeword 2 output by receiver 206. Interference canceller 208 may generate an interference-free received signal vector $\hat{y}_3$, where the interferences due to codewords 1 and 2 are cancelled by removing the effect of codeword 2 from the interference-free received signal vector $\hat{y}_2$.

Similarly to the second stage, a receiver block at an SIC stage i (i=3, ..., C–1) may decode a codeword i based on an interference-free received signal vector $\hat{y}_i$. An interference canceller may output an interference-free received signal vector $\hat{y}_{i+1}$, where the interferences due to codewords 1 through i are cancelled.

At the last stage, receiver block 260 may decode codeword C based on interference-free received signal vector $\hat{y}_C$ as output by interference canceller 258 of stage C–1.

Figure 3:
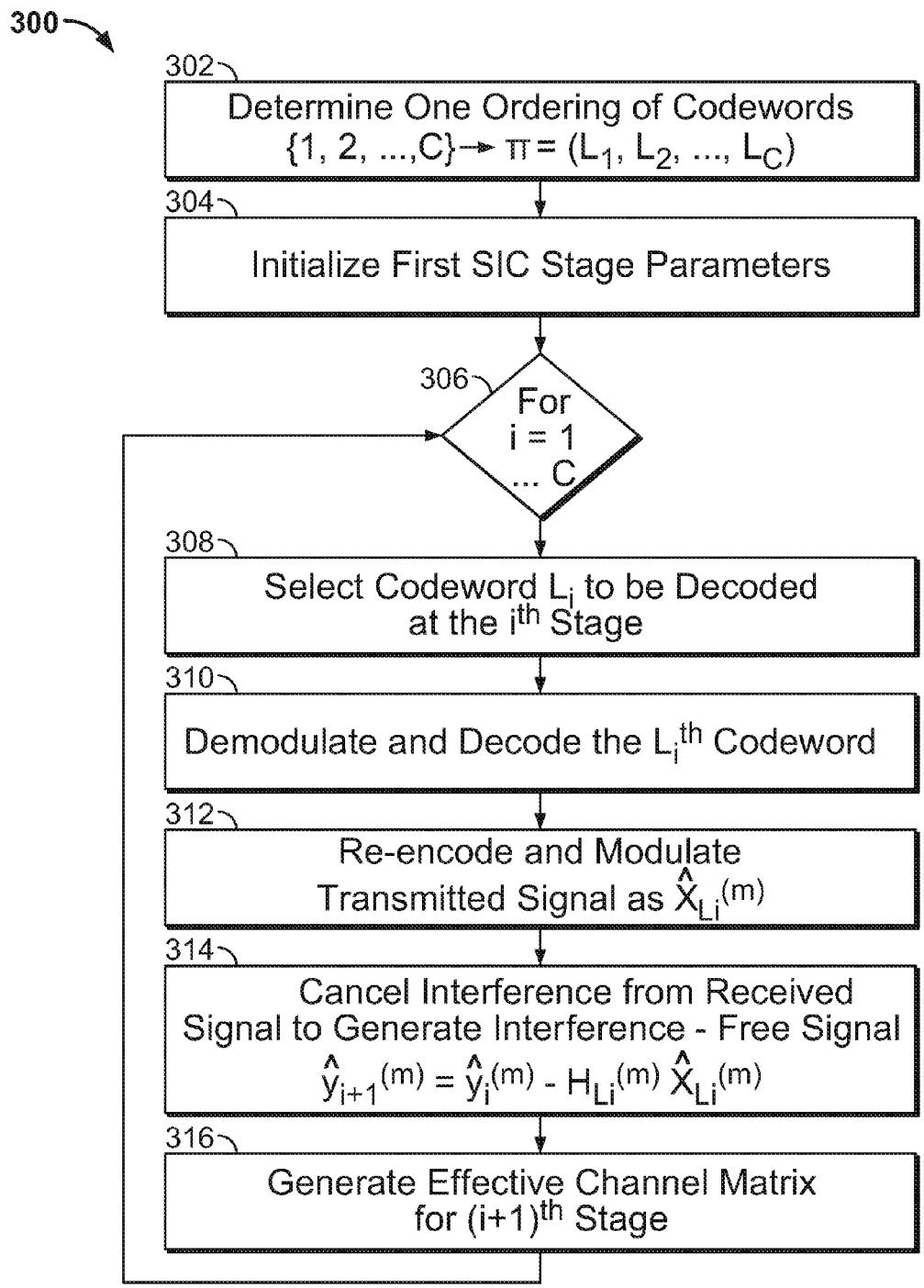
FIG. 3 is a flow diagram illustrating a process for performing SIC in accordance with embodiments of the present disclosure.

One example of a SIC process that can be implemented in receiver and interference canceller blocks of FIG. 2 is illustrated in FIG. 3. FIG. 3 is a flow diagram illustrating process 300 for performing SIC using an exemplary codeword ordering ($L_1, L_2, \ldots, L_C$). Process 300 includes 302, 304, 306, 308, 310, 312, 314, and 316. In some embodiments, 310 may be implemented in receiver blocks of FIGS. 2 and 312, 314, and 316 may be implemented in interference canceller blocks of FIG. 2.

At 302, an ordering for decoding codewords in respective stages of the SIC process is determined. This ordering may be represented mathematically as follows:

$$\{1,2,\ldots,C\} \to \Pi=(L_1,L_2,L_C) \quad \text{(EQ. 3)}$$

In other words, the C codewords (e.g., codewords 101 through 105 of FIG. 1) are mapped to an ordered C-tuple or ordering Π. The tuple Π defines the order in which the codewords may be decoded at each SIC stage i (i=1, ..., C). In the example illustrated in FIG. 2, codewords 1 through C were decoded in that order (i.e., $L_i$=i). However, any suitable ordering Π may be used. Techniques for determining such an ordering will be discussed in further detail below.

At 304, parameters for process 300 may be initialized. For example, the interference-free received signal vector $\hat{y}_1$ used by the first stage (e.g., received by the interference cancellation block 204 of FIG. 2) may be initialized to the received signal vector y. In addition, the effective channel matrix $\hat{H}_1$ for the first stage (e.g., used by the receiver 202 and/or interference canceller 204 of FIG. 2) may be initialized to the effective channel matrix H (e.g., effective channel 130 of FIG. 1).

At 306, it is determined whether all C codewords have been decoded. If all codewords have been decoded (i.e., i>C), process 300 may be terminated. Otherwise, if there is any codeword still undecoded (i.e., 1≤i≤C), the codeword may be decoded using 308, 310, 312, 314, and 316. Each iteration for decoding one codeword may correspond to one SIC stage.

At 308, a codeword to be decoded at SIC stage i is selected. For example, the codeword i to be decoded at SIC stage i may be determined to be $L_i$, as defined by the ordering generated at 302.

At 310, the codeword selected at 308, e.g., the $L_i^{th}$ codeword, may be demodulated and/or decoded based on the interference-free signal received at the $i^{th}$ stage, $\hat{y}_i$, and the SIC-adjusted effective channel matrix at the $i^{th}$ stage, $\hat{H}_i$. This effective channel matrix corresponds to the composite channels for the codewords that have not been decoded at the i–1$^{th}$ stage, i.e., $\hat{H}_i=[H_{L_i}, \ldots, H_{L_C}]$. The specific demodulation and decoding methods used at 310 may depend on the receiver implementation.

At 312, the transmitted signal vector is re-encoded and modulated to generate reconstructed transmitted signal vector $\hat{x}_{L_i}$ that takes into account the interference cancellation due to the $L_i^{th}$ codeword.

At 314, the interference-free received signal vector $\hat{y}_{i+1}$ for stage i+1 is generated by cancelling the interference from the interference-free received signal vector $\hat{y}_i$ for stage i. This may be done by subtracting the effect of the reconstructed transmitted signal vector $\hat{x}_{L_i}$ (i.e., as modified by the channels $H_{L_i}$(m)) corresponding to codeword $L_i$) from the interference-free received signal vector $\hat{y}_i$:

$$\hat{y}_{i+1}(m)=\hat{y}_i(m)-H_{L_i}(m)\hat{x}_{L_i}(m)$$

At 316, the effective channel for the i+1$^{th}$ stage, $\hat{H}_{i+1}$ may be generated. For example, $\hat{H}_{i+1}$ may be generated by deleting the columns corresponding to the channels for the $L_i^{th}$ codeword as follows:

$$\hat{H}_{i+1}(m)=\hat{H}_i(m)\backslash H_{L_i}(m),$$

where A\B denotes the deletion of columns of the matrix B from the matrix A.

Next, 306 may be checked again. The next codeword, $L_{i+1}$, may be decoded next (i.e., i is incremented to i+1), unless all codewords have been decoded, in which case process 300 may be terminated.

Although process 300 describes SIC using iterative stages, this is meant to be illustrative and is not meant to be limiting or exhaustive. The methods and processes described herein apply to other representations of SIC, including QR representation.

Returning to the ordering determination 302 of process 300 of FIG. 3 above, various techniques may be used to determine the ordering in which codewords are decoded in each one of the SIC stages. In some embodiments, a locally optimal ordering is determined based on the channel quality associated with each codeword. Various metrics, such as the Minimum Mean Square Error (MMSE) criterion or the Zero Forcing (ZF) criterion, may be used to determine a channel quality for each codeword. For example, a performance component $\gamma_i$ based on channel quality may be computed for each codeword i. An example of such a performance component may be computed using an average channel gain associated with a codeword i as follows:

$$\gamma_i = \frac{1}{M|S_i|}\sum_{s \in S_i}\sum_{m=1}^{M}\|h_s(m)\|^2$$

where $\|h_s\|$ is the norm of the channel corresponding to a stream s in the stream set $S_i$ of codeword i. Channel norms $\|h_s\|$ are averaged over all streams corresponding to the codeword i (i.e., all streams s in stream set $S_i$) and over all received coded symbol vectors m (i.e., m=1, ..., M) to compute the performance component $\gamma_i$. A locally optimal codeword may be chosen that maximizes the selected performance component. For example, the codeword to be decoded during the first SIC stage, $L_1$ is determined to be the codeword that has the maximum channel gain:

$$L_1=\arg\max_{1<i\leq C}\gamma_i \quad (EQ. 4)$$

To determine the subsequent codewords to be decoded in subsequent SIC stages (i.e., $L_2, L_3, \ldots, L_C$), the same process for determining the first codeword $L_1$ above may be repeated for the remaining C-1 codewords. The metrics or criteria used to compute the channel quality for each one of these remaining codewords may be adjusted given that the interference from the first codeword has been cancelled.

The codeword selected at each stage in this local optimal ordering (e.g., using EQ. 4) only considers the performance components of codewords left undecoded at that particular stage. At each stage, decoding the locally optimal codeword may or may not maximize the interference cancellation of the codewords decoded in other SIC stages, and may assume perfect interference cancellation, which may not always be true. Another consideration is that SIC results in error propagation, because if a codeword decoded at a specific SIC stage is not recovered error-free, then errors may propagate to the interference cancellation of subsequent SIC stages, thereby degrading performance. Even for error-aware orderings (e.g., that use criteria that take into account error propagation between SIC stages), error compensation in a locally optimal ordering (e.g., using EQ. 4) may only be done at the next stage of ordering and decoding.

The locally optimal codeword to decode at a particular SIC stage may not guarantee the largest interference cancellation gain for all codewords, i.e., a global optimum. For example, it may be globally optimal to first decode a codeword that is not locally optimal at that stage. This is illustrated in the following illustrative example. Three codewords 1, 2, and 3 with respective coding rates $R_1=\frac{1}{2}$, $R_2=\frac{1}{2}$, and $R_3=\frac{1}{4}$ are each transmitted in a MIMO system with a noise variance $\sigma^2=0.2$. The respective effective channels associated with each codeword are:

$$h_1 = \begin{bmatrix} 1 \\ 1 \\ 0 \end{bmatrix}; h_2 = \begin{bmatrix} 0 \\ 0 \\ \sqrt{2} \end{bmatrix}; h_3 = \sqrt{\frac{2}{3}} \begin{bmatrix} 1 \\ 1 \\ 1 \end{bmatrix}$$

In this example, the locally optimal ordering based on an MMSE criterion can be determined to be $\Pi_1=(2, 1, 3)$. This locally optimal ordering achieves a resulting SNR of $[SNR^{(1)}=1.11, SNR^{(2)}=1.36, SNR^{(3)}=2]$ for codewords 1, 2, and 3, respectively. A different ordering $\Pi_2=(3, 1, 2)$, however, achieves a better global resulting SNR, $[SNR^{(1)}=2, SNR^{(2)}=2, SNR^{(3)}=0.67]$. While the interference gain of codeword 3 in ordering $\Pi_2$ is lower than in ordering $\Pi_1$, it is still possible to decode codeword 3 successfully because of its low coding rate ($R_3=\frac{1}{4}$). Compared to $\Pi_1$, ordering $\Pi_2$ achieves higher SNR and interference cancellation gain values for codewords 1 and 2, which have a higher coding rate than codeword 3 ($R_1=R_2=\frac{1}{2}$). Therefore, the locally suboptimal ordering $\Pi_2$ achieves a better overall resulting SNR than the locally optimal ordering $\Pi_1$. This example illustrates that determining a globally optimal ordering may need to consider all possible orderings, and not only the locally optimal codeword at each SIC stage.

Figure 4:
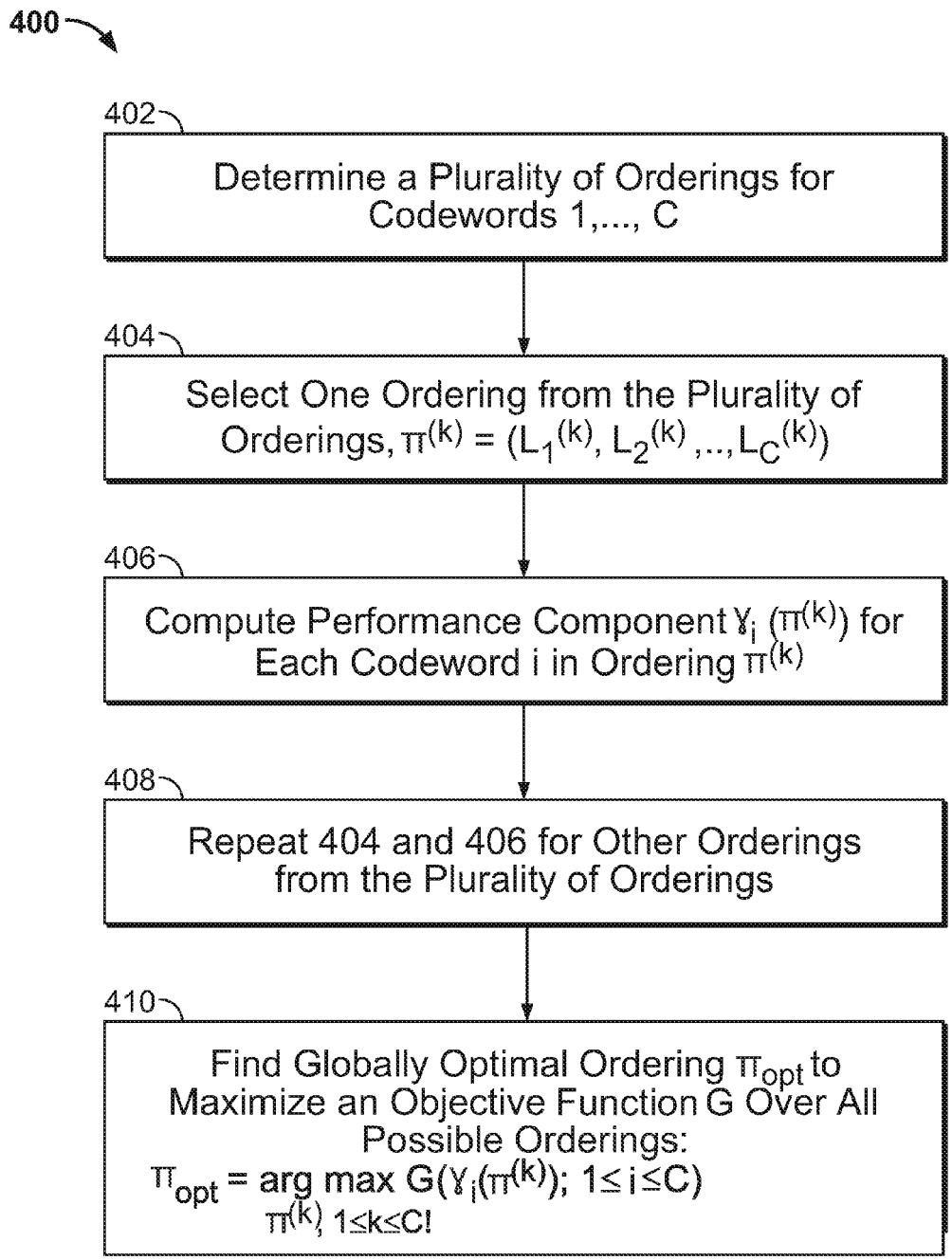
FIG. 4 illustrates a process for determining a globally optimal SIC ordering for codewords in accordance with embodiments of the present disclosure.

FIG. 4 illustrates a process for determining a globally optimal SIC ordering for codewords in accordance with some embodiments. Process 400 includes 402, 404, 406, 408, and 410 and may be implemented in processing circuitry of receiver 180 of FIG. 1 or receiver/interference cancellation blocks of FIG. 2.

At 402, a plurality of K orderings of codewords 1 through C is determined. In some embodiments, all possible orderings (i.e., $K=C!=C\times(C-1)\times\ldots\times 1$) may be determined. In some embodiments, a subset of all possible orderings may be determined.

At 404, one ordering from the determined plurality of K orderings is selected. This ordering may be represented as:

$$\Pi^{(k)}=(L_1^{(k)},L_2^{(k)},\ldots,L_C^{(k)}),$$

where k denotes the selected ordering (k=1, . . . , K), and $L_i^{(k)}$ (i=1, . . . , C) is the $i^{th}$ codeword to decode in that particular ordering $\Pi^{(k)}$.

At 406, a performance component $\gamma_i$ is computed for each codeword i in the ordering $\Pi^{(k)}$ selected at 404. This performance component may be based on packet error rate (PER), equalizer-output Signal-to-Interference and Noise Ratio (SINR), channel gain, achievable data-rate, and/or any other suitable performance metric.

At 408, the ordering selection at 404 and performance computation at 406 may be repeated for other orderings from the plurality of orderings determined at 402. In this way, each one of the plurality of orderings determined at 402 may be associated with C performance components for each one of the C codewords in that ordering.

At 410, a globally optimal ordering from the plurality of orderings determined at 402 is determined. This ordering may be selected to maximize a particular objective function G, such as total throughput or total probability of decoding for codewords arranged in a corresponding ordering. The objective function may be predetermined or may be dynamically determined based on receiver implementation, channel conditions, and/or any suitable criterion. The objective function may be computed for each ordering based on the performance components of the C codewords in that ordering, i.e., $G(\gamma_i(\Pi^{(k)}); 1\le i\le C)$. The globally optimal $\Pi_{opt}$ may be determined as follows:

$$\Pi_{opt} = \underset{\Pi^{(k)},1\le k\le C!}{\operatorname{argmax}} G(\gamma_i(\Pi^{(k)}); 1\le i\le C), \quad (\text{EQ. 5})$$

where $\Pi_{opt}$ is the ordering $\Pi^{(k)}$ that maximizes the objective function G over all C! orderings. Because $\Pi_{opt}$ considers performance components of codewords as arranged in all possible orderings, $\Pi_{opt}$ corresponds to a global optimum.

Any appropriate objective function G may be used in EQ. 5. For example, objective function G for a particular ordering may correspond to a total throughput achieved by the corresponding ordering. Objective function G may also measure a total decoding probability, a total Signal-to-Interference and Noise Ratio (SINR), and/or a total channel gain for the codewords in each ordering. Objective function G may measure a minimum performance metric for one codeword among all the codewords in each ordering. For example, objective function G may correspond to a minimal throughput for a codeword among all codewords in the corresponding ordering, a lowest decoding probability for a codeword among all codewords in the ordering, a minimal SINR for a codeword among all codewords in the corresponding ordering, and/or a minimal channel gain for a codeword among all codewords in the corresponding ordering. These objective functions are merely illustrative, and are not meant to be limiting or exhaustive in any way. Any appropriate objective function may be chosen without departing from the scope of the disclosure.

In some embodiments, a performance component of a codeword may be computed using a probability that an error occurred in the received codeword. This probability may be evaluated using a packet error rate (PER), which may be calculated as the number of erroneously received data packets divided by the total number of received packets. Performance components based on PER may be computed for each one of the C codewords in each one of the C! possible ordering, to determine the globally optimal ordering, e.g., as described in process 400 above. However, this may be prohibitively expensive in terms of complexity and/or time. In some embodiments, instead of decoding all codewords for each ordering and computing performance components (e.g., collecting PER) for each decoded codeword and each ordering, performance components may be predicted from the channel information. An exemplary implementation of this is shown in FIG. 5.

Figure 5:
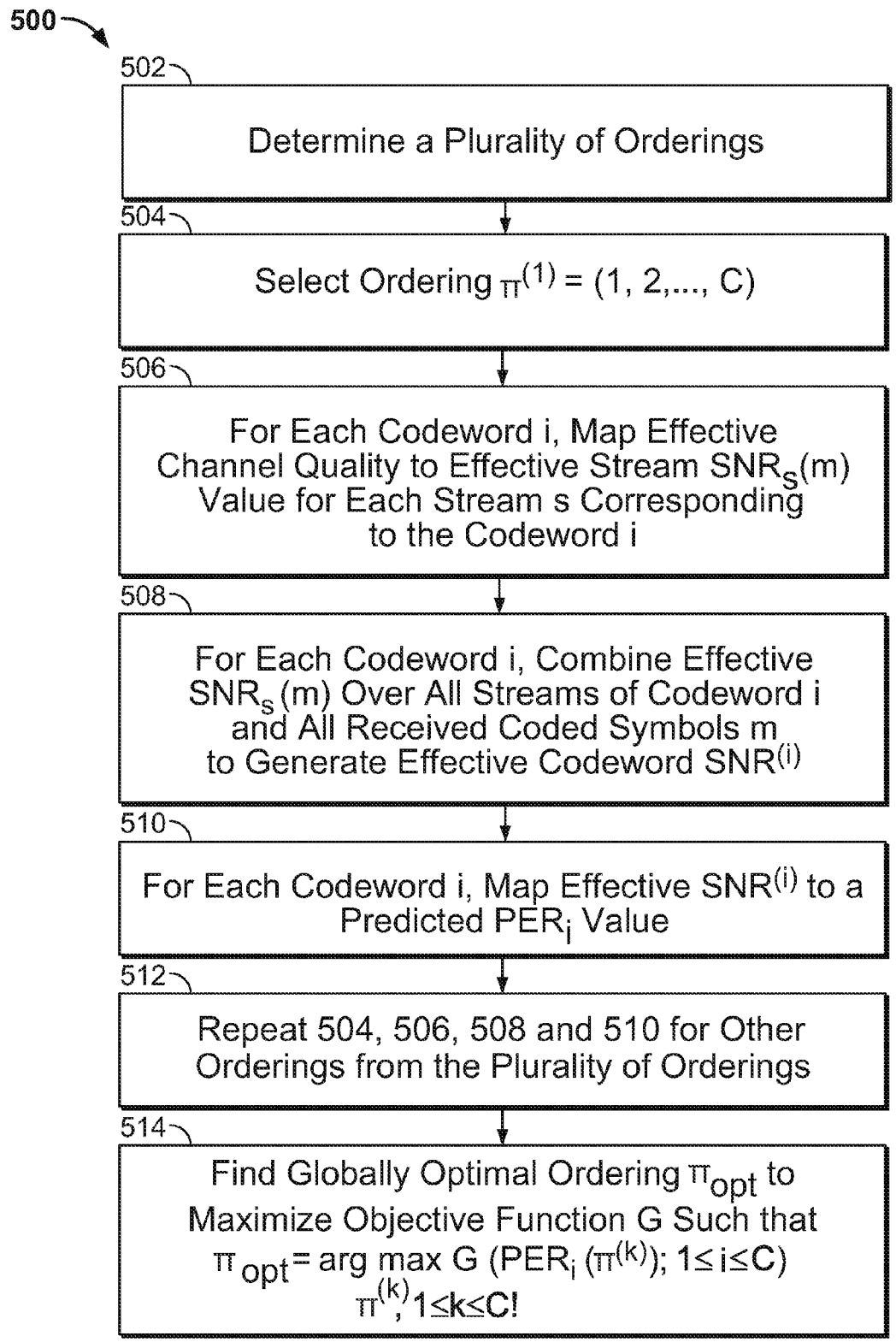
FIG. 5 is a flow diagram illustrating a process to determine a SIC ordering using performance components predicted from channel information, in accordance with embodiments of the present disclosure.

FIG. 5 is a flow diagram illustrating process 500 to determine a SIC ordering using performance components predicted from channel information, in accordance with embodiments of the present disclosure. Process 500 includes 502, 504, 506, 508, 510, 512, and 514, and may be implemented in processing circuitry of receiver 180 of FIG. 1 or receiver/interference cancellation blocks of FIG. 2.

At 502, a plurality of possible orderings K is determined. This may be done similarly to 402 of FIG. 4 above.

At 504, one ordering is selected from the possible orderings determined at 502. For purposes of illustration, exemplary ordering $\Pi^{(1)}=(1, 2, \ldots, C)$ will be used in the description of 504, 506, 508, and 510 below. This is not meant to be limiting or exhaustive in any way, and generally any ordering $\Pi^{(k)}$ may be selected.

At 506, and for each codeword i in the ordering selected at 504, an effective channel quality $\hat{H}_i$ associated with the codeword i is mapped to an effective stream $SNR_S$ value for each stream s that corresponds to the codeword i. This may be represented as follows:

$$\{H_i(m),\sigma^2,E_i\}\rightarrow SNR_s(m); 1\le m\cdot M, s\in S_i,$$

where $SNR_S(m)$ is the effective stream $SNR_S$ value per coded symbol m for a stream s in the stream set $S_i$ corresponding to codeword i, $\hat{H}_i(m)$ is the effective channel at the $i^{th}$ stage (i.e., after deleting the channels of the previously decoded codewords as described at 316 of FIG. 3 above), $\sigma^2$ is the variance associated with the transmission channel, and $E_i$ is the accumulated error propagation at the $i^{th}$ stage from pervious SIC stages. The particular mapping from channel quality to effective SNR depends on the type of equalizer (e.g., MMSE), the error compensation method, and/or the mapping method. Examples of the mapping method include, but are not limited to, finite alphabet capacity (FAC), mean mutual information per bit (MMIB), and exponential effective SNR mapping (EESM).

At 508, and for each codeword i ($1 \leq i \leq C$), the effective stream $SNR_s(m)$ values computed at 506 are combined over all streams corresponding to codeword i and over all coded symbols to generate an effective codeword $SNR^{(i)}$ value. For example, the effective stream $SNR_S(m)$ values may be averaged over all coded symbols m (i.e., m=1, ..., M) and over all streams corresponding to codeword i (i.e., all streams s in stream set $S_i$) as follows:

$$SNR^{(i)} = \frac{1}{M|S_i|} \sum_{s \in S_i} \sum_{m=1}^{M} SNR_s(m); 1 \leq i \leq C$$

At 510, the effective codeword $SNR^{(i)}$ value is mapped to a predicted PER using pre-collected statistics for the corresponding coding rate. For example, look-up tables mapping various ranges of codeword $SNR^{(i)}$ values to $PER_i$ values for different coding rates may be used. This may be represented as:

$$PER_i = f_{Coding-Rate}(SNR^{(i)}),$$

where $f_{Coding-Rate}$ corresponds to the PER mapping function used in the receiver implementation.

At 512, the ordering selection at 504, effective channel quality mapping at 506, effective codeword SNR generation at 508, and codeword $PER_i$ computation at 510 may be repeated for each codeword i ($1 \leq i \leq C$) in each one of the plurality of possible orderings determined at 502.

At 514, an optimal ordering $\Pi_{opt}$ is determined that maximizes an objective function G over all possible orderings $\Pi^{(k)}$ ($1 \leq k \leq K$). This may be done using EQ. 5, by setting performance component $\gamma_i$ of each codeword i in each ordering $\Pi^{(k)}$ to the $PER_i$ value corresponding to the codeword i in that ordering (i.e., $\gamma_i(\Pi^{(k)}) = PER_i(\Pi^{(k)})$ for $1 \leq k \leq K$ and $1 \leq i \leq C$).

For each ordering $\Pi^{(k)}$, the objective function G may consider the joint performance of codewords arranged in that particular ordering. One exemplary objective function may include overall decoding probability for a particular ordering. For example, for a given ordering $\Pi$, the objective function G may be the sum of the probability of successful transmission (1-$PER_i$) of all codewords i, each weighted by the data rate $R_T$ associated with the respective codeword i, as follows:

$$G(\gamma_i(\Pi)) = \sum_{i=1}^{C} R_i \times (1 - \gamma_i(\Pi)) = \sum_{i=1}^{C} R_i \times (1 - PER_i(\Pi))$$

Another exemplary objective function may measure total throughput. For example, for a given ordering $\Pi$, the objective function G may be the probability that all C codewords were successfully transmitted, i.e.:

$$G(\gamma_i(\Pi)) = \Pi_{i=1}^{C}(1 - \gamma_i(\Pi)) = \Pi_{i=1}^{C}(1 - PER_i(\Pi))$$

These objective functions are merely illustrative and are not meant to be exhaustive or limiting. For example, objective function G may measure a total Signal-to-Interference and Noise Ratio (SINR), channel gain, and/or any suitable performance metric for the codewords in each ordering. Objective function G may measure a minimal throughput, decoding probability, channel gain, SINR, and/or any suitable performance metric for one codeword among all codewords in the corresponding ordering. Any appropriate objective function may be chosen without departing from the scope of the disclosure.

As illustrated in FIGS. 4 and 5 above, performance components ($\gamma_i(\Pi^{(k)})$) may be computed for each codeword i ($1 \leq i \leq C$) in each one of all possible orderings ($1 \leq k \leq C!$). Since each ordering may require C performance components (for each one of the C codewords), a total of C×C! performance components may need to be computed. For example, in the case of 4 codewords, there may be a total of 4!=24 orderings to consider and 4×4!=96 performance components to compute. Techniques for reducing complexity may be employed to increase efficiency of determining the globally optimal SIC ordering without needing to compute all C×C! performance components.

One such complexity reduction technique is based on recognizing that a same performance component may be reused for different orderings. For example, a performance component $\gamma_1$ for codeword 1 may be the same for all orderings that begin with codeword 1, e.g., $\Pi=(1, 2, 3, 4)$ and $\Pi=(1, 2, 4, 3)$. Therefore, this performance component may be computed only once and may used for all orderings that begin with codeword 1. Therefore, in some embodiments, a performance component may be computed once for each particular one of the C codewords that may be decoded first. These performance components may be used for all orderings that begin with that particular codeword. For example, these performance components may be saved, e.g., in a storage area of the receiver. Similarly, a performance component may be computed once for each particular one of the C×(C-1) possible codewords to be decoded second given a first decoded codeword $L_1$. These performance components may be used for all orderings that begin with codeword $L_1$ followed by the particular codeword. Generally, the performance components can be computed, in a recursive fashion, for each particular one of the C×(C-1)×...×(C-k+1) codewords to be decoded as the $k^{th}$ codeword given the first k-1 decoded codewords. These performance components may be stored in a storage area of the receiver for use by all orderings that begin with the same k codewords. This low complexity performance components computation can be represented, but not limited to, a tree of components as explained below. Other representations, such as trellis, can also be applied in some embodiments. The low complexity performance components computation can be implemented serially as described herein, or may be executed or performed in parallel where appropriate to reduce latency and processing times.

A tree of performance components may be used to represent unique performance components for all codewords in all possible orderings. In this tree, each node (other than the root node) may represent one performance component for a codeword i in a specific position k (k=1, ..., C) in all possible orderings.

Figure 6A:
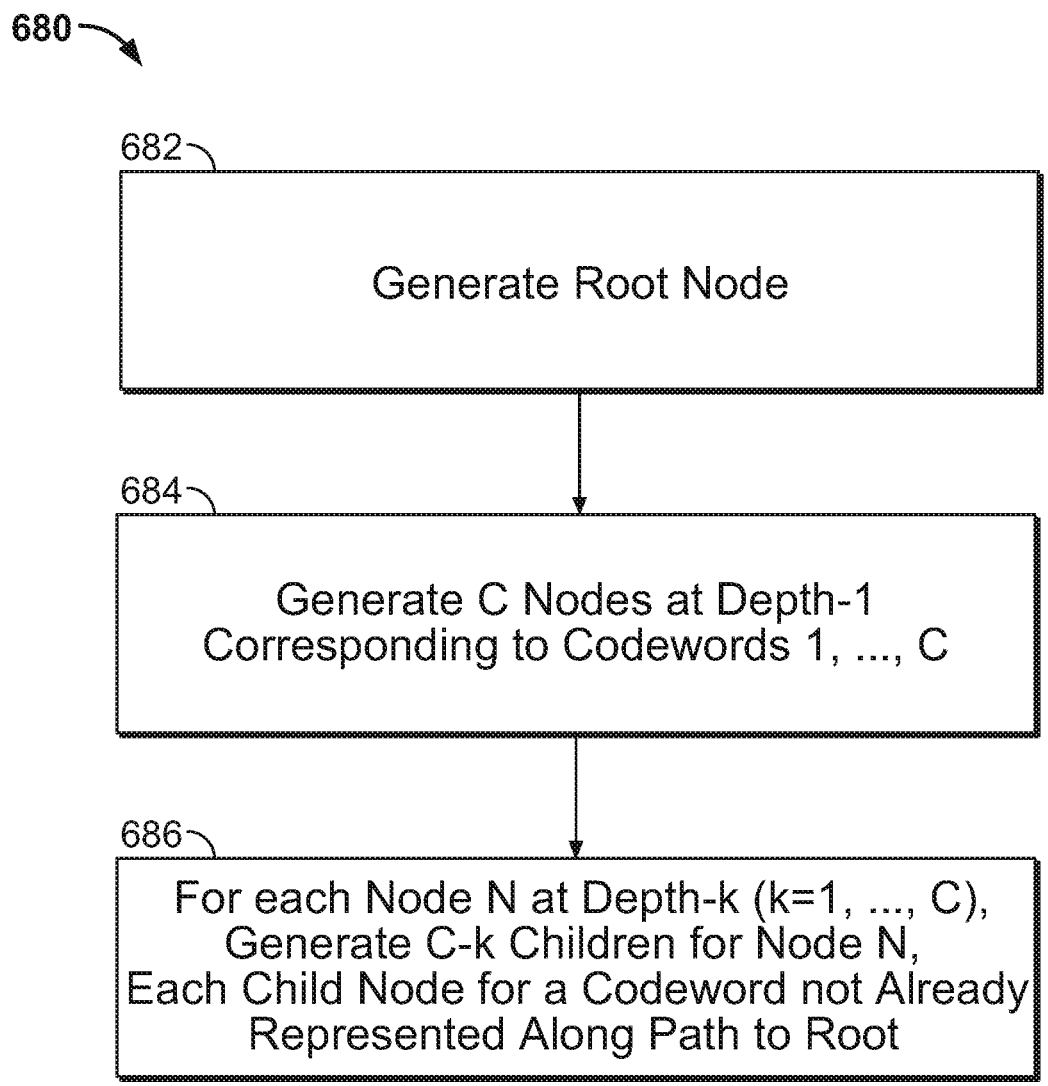
FIG. 6A is a flow diagram illustrating a process for generating a tree to compute performance components of codewords with reduced complexity in a SIC process in accordance with embodiments of the present disclosure.

FIG. 6A is a flow diagram illustrating process 680 for generating a tree of performance components in a SIC process in accordance with embodiments of the present disclosure. In some embodiments, process 680 may be employed as part of 406 of process 400 of FIG. 4 or 510 of process 500 of FIG. 5. In some embodiments, process 680 may be performed prior to, or in parallel with, process 400 of FIG. 4 or process 500 of FIG. 5. Process 680 may include 682, 684, and 686, and be implemented in processing circuitry of receiver 180 of FIG. 1 or receiver/interference cancellation blocks of FIG. 2.

Figure 6B:
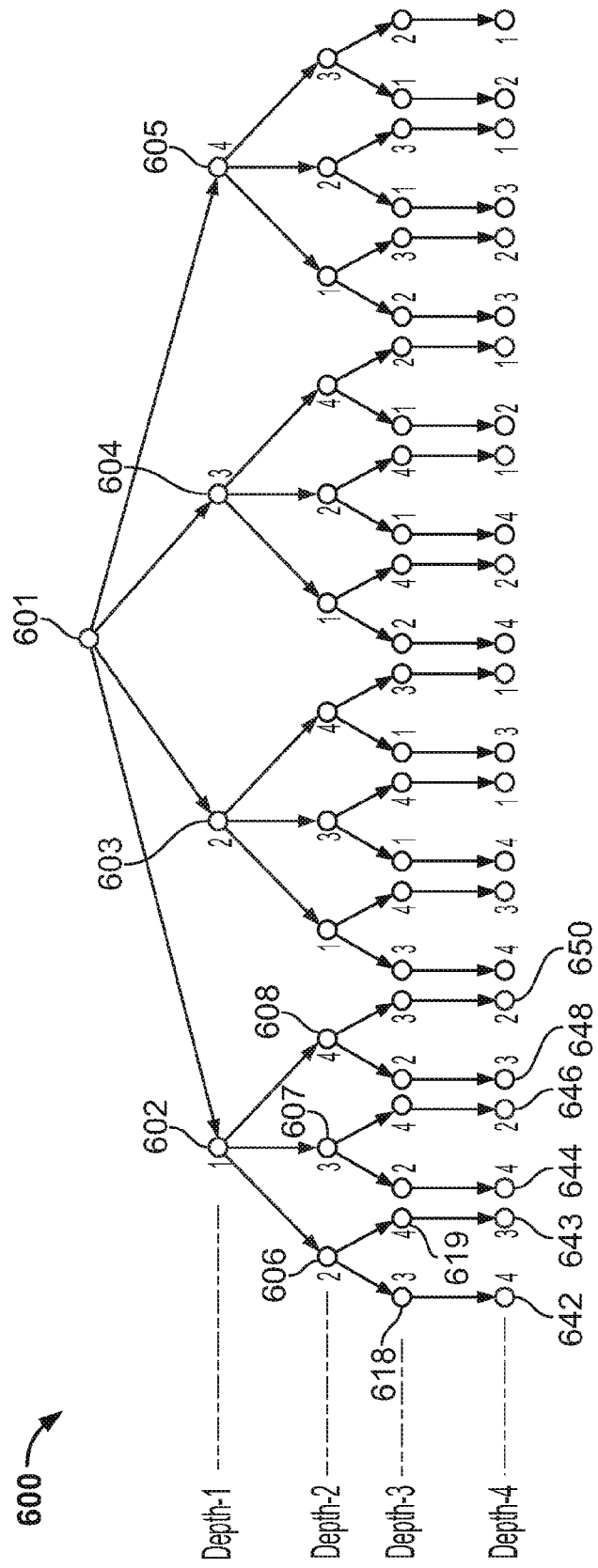
FIG. 6B is an exemplary tree of performance components of codewords illustrating the process of FIG. 6A in accordance with embodiments of the present disclosure.

FIG. 6B is an exemplary tree 600 of performance components that may have been generated using process 680 of FIG. 6A for the illustrative case of C=4. Each node represents a performance component $\gamma_i$ to compute for a codeword i at the $k^{th}$ tree layer, or depth-k. This $k^{th}$ tree layer, or depth-k, represents the $k^{th}$ position in a SIC ordering, or equivalently, the $k^{th}$ SIC stage in which codeword i is decoded. The number shown next to each node denotes the associated codeword i. Although process 680 will be described below using tree 600, this is merely exemplary and is not meant to be limiting or exhaustive.

At 682, the tree is initialized by generating a root node. For example, root node 601 of tree 600 may be generated at 682. This root node may represent no performance component.

At 684, C children nodes of the root node are generated as the first layer of the tree (i.e., at depth-1). Each node corresponds to a respective one of the C codewords, and represents a performance component $\gamma_i$ for a codeword i in all possible orderings that begin with this codeword.

In the exemplary tree 600, C=4 codewords 602, 603, 604, and 605 are generated at depth-1 of the tree. Node 602, for example, represents a performance component $\gamma_1$ for codeword 1 in all orderings Π that begin with codeword 1.

At 686, other nodes of the tree may be generated as follows: For each node N at depth-k (k=1, ..., C), C−k children nodes are generated, where each child node is associated with a codeword that is not already represented by the nodes along the path from the root node to node N. In other words, if the nodes on the path from the root node to the node N at depth-k correspond to codewords $L_1 < L_2 < \ldots < L_k$ in that order, then the children of this node N are selected from the set of codewords other than the codewords associated with nodes on the path to the root node (i.e., other than $L_1, L_2, \ldots, L_k$). This set of codewords from which the children nodes of the node N may be generated can be represented as $\{1, \ldots, C\} \setminus \{L_1, L_2, \ldots, L_k\}$, where A\B represents set A without the elements of set B.

In the exemplary tree 600, nodes at depth-2, depth-3, and depth-4 may be generated using 686. For example, for node 602 at depth-1, C−k=4−1=3 children nodes are generated from set $\{1, \ldots, C\} \setminus \{L_1, L_2, \ldots, L_k\} = \{1, 2, 3, 4\} \setminus \{1\} = \{2, 3, 4\}$.

The total number of performance components to compute using a tree as illustrated in process 680 of FIG. 6A above is equal to the number of nodes of the generated tree, i.e., $$\sum_{k=0}^{C-1} \frac{C!}{k!}.$$

This represents a significant reduction relative to computing C×C! performance components in a process that computes C performance components for each one of C! orderings. For example, in the case illustrated in FIG. 6B, tree 600 has a total of 4+4×3+4×3×2+4×3×2×1=64 nodes, representing 64 performance components to compute. This corresponds to ⅔ of the total number of performance components (i.e., a ⅓ complexity reduction) compared to the process that computes all C×C!=96 performance components.

The complexity of computing performance components may be further reduced based on the following observation: in some systems, the error propagation in a SIC process from cancelling the interferences of codeword m then codeword n is the same as that from cancelling the interferences of codeword n and then codeword m. In other words, the ordering of codewords in a SIC process may be irrelevant to the error propagation between SIC stages. In its simplest form, the assumption of perfect cancellation implies this order independence of error propagation because it assumes that no error is propagated between SIC decoding stages.

In some embodiments, the order independence of error propagation may be applied in the following way: given a partition of codewords to decode before a codeword i in an ordering Π, the performance component of this codeword i depends on what codewords are in the partition of codewords before codeword i (equivalently, in the partition of codewords after codeword i), but not on the particular order of codewords within these partitions. In other words, given two different orderings $\Pi_m$ and $\Pi_n$, where a codeword i has the same position k in each ordering, and where the partitions before and after codeword i are respectively the same, the performance components of codeword i in the two orderings are identical. This may be represented mathematically as:

$$\Pi_m = (L_1^{(m)} \ldots L_{k-1}^{(m)} i L_{k+1}^{(m)} \ldots L_C^{(m)})$$

$$\Pi_n = (L_1^{(n)} \ldots L_{k-1}^{(n)} i L_{k+1}^{(n)} \ldots L_C^{(n)})$$

$$\gamma_i(\Pi_m) = \gamma_i(\Pi_n) \Leftrightarrow \{L_1^{(m)} \ldots L_{k-1}^{(m)}\} = \{L_1^{(n)} \ldots L_{k-1}^{(n)}\},$$

where { } corresponds to a set (irrespective of order of the elements in the set) and ( ) corresponds to a tuple (defining the particular order of elements in the corresponding ordering). Codeword i has the same performance components in both orderings (i.e., $\gamma_i(\Pi_m) = \gamma_i(\Pi_n)$) if and only if the set of k−1 elements that precede codeword i in ordering $\Pi_m$ is the same as the set of k−1 elements that precede codeword i in ordering $\Pi_n$ (irrespective of order). This set of k−1 elements preceding a particular codeword i in an ordering will be referred to herein as a partition of preceding codewords correspond to codeword i in that ordering.

Using this observation of order-independent error propagation, fewer performance components may need to be computed. For example, the tree generation techniques from FIGS. 6A and 6B above may be modified to only compute performance components for codewords having unique partitions of preceding codewords. The tree representation of the performance computation is only for example and not limiting. Other representations, such as trellis, can also be applied in some embodiments. Although the low complexity performance components computation is described above using a serial implementation, this process may be executed or performed substantially simultaneously where appropriate or in parallel to reduce latency and processing times.

Figure 7A:
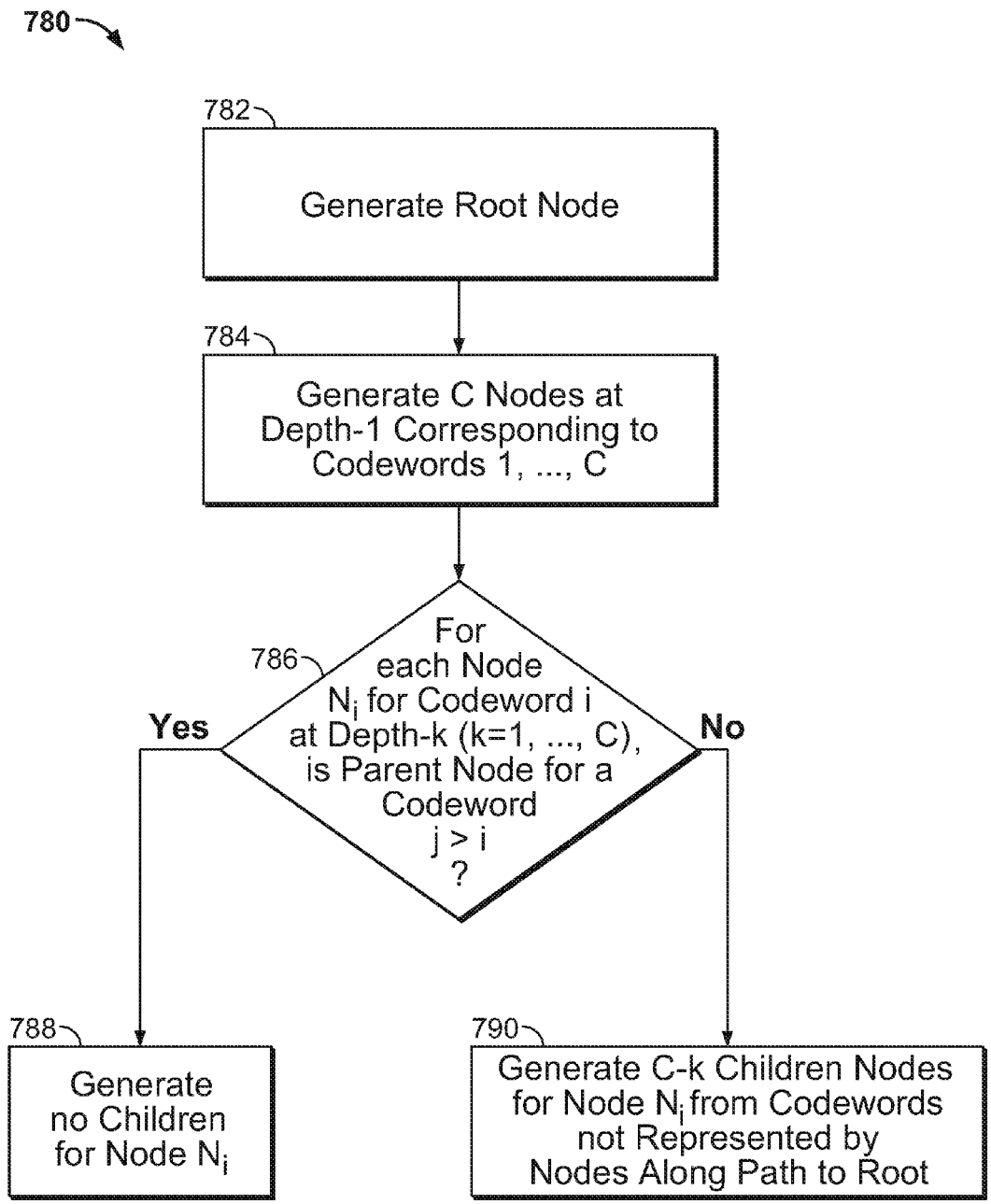
FIG. 7A is a flow diagram illustrating a process for generating a tree to compute performance components of codewords with further reduced complexity in a SIC process in accordance with embodiments of the present disclosure.

FIG. 7A is a flow diagram illustrating process 780 for generating a tree of performance components in a SIC process in accordance with embodiments of the present disclosure. In some embodiments, process 780 may be employed as part of 406 of process 400 of FIG. 4 or 510 of process 500 of FIG. 5. In some embodiments, process 680 may be performed prior to, or in parallel with, process 400 of FIG. 4 or process 500 of FIG. 5. Process 780 may include 782, 784, 7786, 788, and 790, and be implemented in processing circuitry of receiver 180 of FIG. 1 or receiver/interference cancellation blocks of FIG. 2.

Figure 7B:
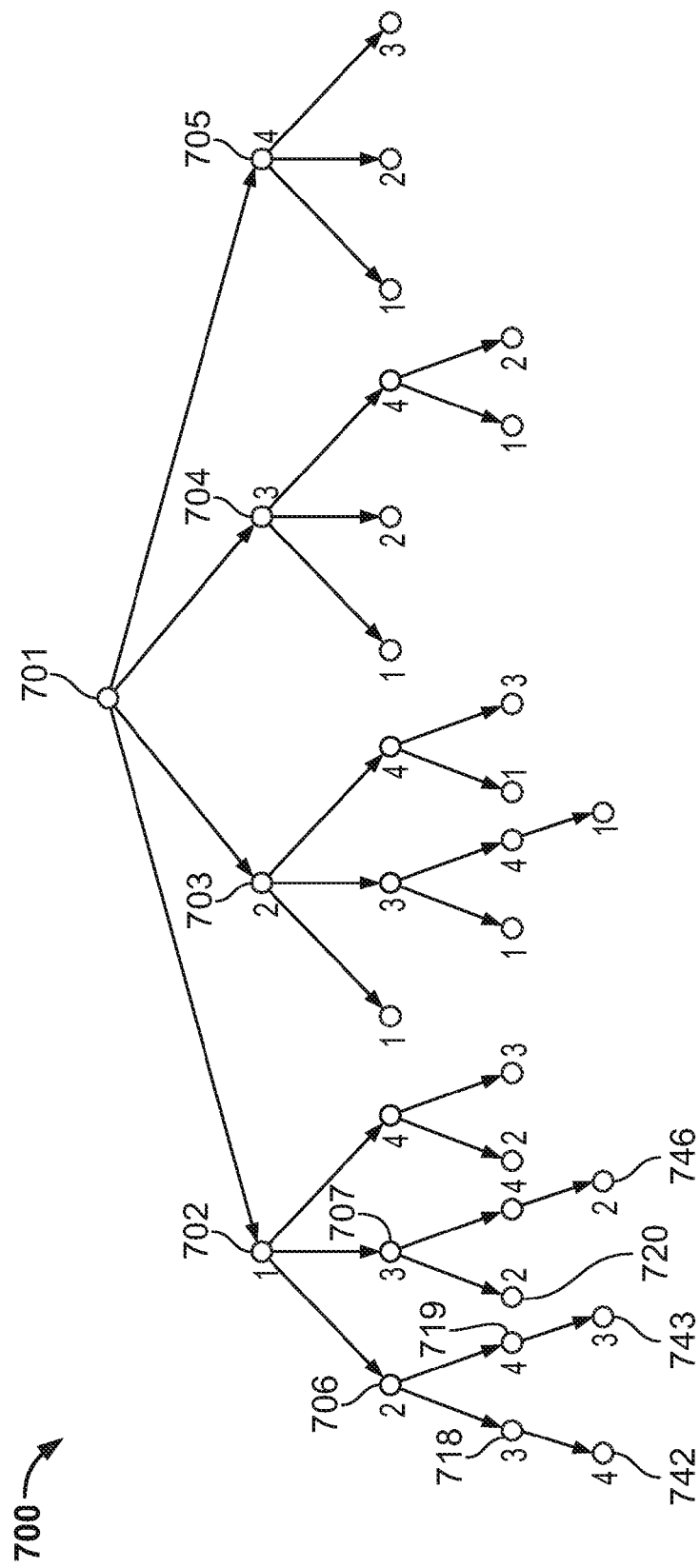
FIG. 7B is an exemplary tree of performance components of codewords illustrating the process of FIG. 7A in accordance with embodiments of the present disclosure.

FIG. 7B is an exemplary tree 700 of performance components that may have been generated using process 780 of FIG. 7A for the illustrative case of C=4. Each node represents a performance component $\gamma_1$ to compute for a codeword i at the $k^{th}$ tree layer, or depth-k (corresponding to the position of the codeword i in the ordering). The number shown next to each node denotes the associated codeword i. Although process 780 will be described below using tree 700 of FIG. 7, this is merely exemplary and is not meant to be limiting or exhaustive.

At 782, the tree is initialized by generating a root node. For example, root node 701 of tree 700 may be generated at 702. This root node may represent no performance component.

At 784, C children nodes of the root node are generated as the first layer of the tree (i.e., at depth-1). Each node corresponds to a respective one of the C codewords, and represents a performance component $\gamma_1$ for a codeword i in all possible orderings that begin with this codeword.

In the exemplary tree 700, C=4 codewords 702, 703, 704, and 705 are generated at depth-1 of the tree. Node 702, for example, represents a performance component $\gamma_1$ for codeword 1 in all orderings Π that begin with codeword 1.

At 786, the rest of the tree may be generated as follows: For each node N associated with a codeword i at depth-k (k=1, . . . , C), it is determined whether the parent node represents a performance component for a codeword j such that j is larger than i (j>i). If the parent is associated with a codeword j>i, then no children nodes are generated for node N at 788. Otherwise, if the parent is associated with a codeword j≤i, then children nodes are generated for node N according to 790. It should be noted that the condition of 786 (i.e., j>i) is merely exemplary and is not intended to be exhaustive or limiting in any way. Other conditions may be used such as performance components are computed for codewords having unique partitions of preceding codewords.

At 790, C−k children nodes are generated for node N, where each child node is associated with a codeword that is not already represented by the nodes along the path from node N to the root node. In other words, if the nodes on the path from the root node to the node N at depth-k correspond to codewords $L_1 < L_2 < \ldots < L_k$ in that order, then the children of this node N are selected from the set of codewords other than the codewords associated with nodes on the path to the root node (i.e., other than $L_1, L_2, \ldots, L_k$). This set of codewords from which the children nodes of the node N may be generated can be represented as $\{1, \ldots, C\} \setminus \{L_1, L_2, \ldots, L_k\}$, where A\B represents set A without the elements of set B. The condition of 786 thus ensures that children nodes are only generated for a codeword with a unique partition of codewords preceding it in the path to the root node.

In the exemplary tree 700, nodes at depth-2, depth-3, and depth-4 may be generated using 786. For example, for node 702 at depth-1, C−k=4−1=3 children nodes are generated from set $\{1, \ldots, C\} \setminus \{L_1, L_2, \ldots, L_k\} = \{1, 2, 3, 4\} \setminus \{1\} = \{2, 3, 4\}$.

At depth-2, node 707 corresponds to codeword 3 and its parent node 702 corresponds to codeword 1. Since node 707 corresponds to a codeword that has a higher index than that of its parent node (i.e., 3>1), then C−k=4−2=2 children nodes are generated for node 707 from set $\{1, 2, 3, 4\} \setminus \{1, 3\} = \{1, 2\}$.

At depth-3, node 720 corresponds to codeword 2 and its parent node 707 corresponds to codeword 3. Since node 720 corresponds to a codeword that has a lower index than that of its parent node (i.e., 2<1), then no children nodes are generated for 720.

The total number of performance components to compute using a tree as illustrated in process 780 of FIG. 7A above is equal to the number of nodes of the generated tree, i.e., $C \times 2^{c-1}$. This represents a significant reduction relative to independently computing C×C! performance components or to computing $$\sum_{k=0}^{C-1} \frac{C!}{k!}$$

using process 680 of FIG. 6A above. For example, in the case illustrated in FIG. 7B, tree 700 has a total of 4+12+12+4=32 nodes corresponding to 32 performance components to compute. This is equal to ⅓ of the total number of performance components (i.e., represents a ⅔ complexity reduction) compared to the process that computes all C×C!=96 performance components.

The above steps of the flowcharts of FIGS. 3, 4, 5, 6A, and 7B may generally be executed or performed in any order or sequence not limited to the order and sequence shown and described in the figure. Also, some of the above steps of processes 300, 400, 500, 680, and 780 may be executed or performed substantially simultaneously where appropriate or in parallel to reduce latency and processing times. Any of the steps in these processes may be omitted, modified, combined, and/or rearranged, and any additional steps may be performed, without departing from the scope of the present disclosure.

The foregoing describes systems and methods for reliable and efficient information transmission. Those skilled in the art will appreciate that the disclosed methods and systems can be practiced by other than the described embodiments, which are presented for the purpose of illustration rather than of limitation. Modifications and variations are possible in light of the above teachings or may be acquired from practice of the disclosed methods and systems. While certain components of this disclosure have been described as implemented in hardware and others in software, other configurations may be possible.

What is claimed is:

1. A method for determining a successive interference cancellation (SIC) ordering for a plurality of codewords, the method comprising:

for each ordering of a plurality of SIC orderings of the codewords, mapping an effective channel quality associated with each codeword to a Packet Error Rate (PER) value associated with the each codeword, wherein said mapping is based on a position of the each codeword in the each ordering; and selecting, using decoder circuitry, one ordering from the plurality of SIC orderings for decoding the codewords using SIC, wherein said selecting is based on a performance objective computed from the PER value associated with the each codeword.

2. The method of claim 1, further comprising:

receiving the plurality of codewords;

identifying the plurality of SIC orderings for the received codewords, wherein each ordering defines a unique order of the received codewords for decoding using SIC; and after receiving the plurality of codewords, performing said mapping the effective channel quality for the each ordering based on the identified plurality of SIC orderings.

3. The method of claim 1, wherein said mapping comprises computing one of the group consisting of a predicted Packet Error Rate (PER) value, a Signal-to-Interference and Noise Ratio (SINR) value, a channel gain, and an achievable data rate for the each codeword.

4. The method of claim 1, wherein said mapping comprises:
  mapping the effective channel quality associated with the each codeword to an effective stream Signal-to-Noise ratio (SNR) value for each stream of a plurality of streams associated with the each codeword;
  combining effective stream SNR values for the plurality of streams associated with the each codeword to generate an effective codeword SNR value for the each codeword; and
  mapping the effective codeword SNR value to the performance objective associated with the each codeword.

5. The method of claim 1, further comprising computing a unique performance component for the each codeword at a particular position in the each ordering.

6. The method of claim 5, further comprising generating a tree of nodes arranged in a plurality of layers associated with respective SIC stages, wherein each node at a particular layer represents the unique performance component for a codeword to be decoded in a SIC stage associated with the particular layer.

7. The method of claim 6, further comprising:
  generating a first layer of the tree, wherein the first layer comprises a plurality of nodes associated with respective ones of the codewords; and
  generating a child node of the node N, wherein a path from a root node of the tree to the node N comprises at least one path node, and wherein the child node is associated with a codeword other than at least one codeword associated with the at least one path node.

8. The method of claim 5, wherein said computing a unique performance component comprises computing a performance component for a codeword in the each ordering in response to determining that the codeword is preceded by a unique partition of codewords in the each ordering.

9. The method of claim 8, further comprising:
  generating a first layer of the tree, wherein the first layer comprises a plurality of nodes associated with respective ones of the codewords;
  for a node N of the tree associated with a codeword i, determining if a parent node of the node N is associated with a codeword j where j is larger than i; and
  in response to determining that the parent node of node N is associated with a codeword j where j is larger than i, generating a child node of the node N, wherein a path from a root node of the tree to the node N comprises at least one path node, and wherein the child node is associated with a codeword other than at least one codeword associated with the at least one path node.

10. The method of claim 1, wherein the performance objective is based on at least one selected from the group consisting of:
  a total throughput for the codewords in the each ordering;
  a total decoding probability for the codewords in the each ordering;
  a total Signal-to-Interference and Noise Ratio (SINR) for the codewords in the each ordering;
  a total channel gain for the codewords in the each ordering;
  a minimal throughput for a codeword among all codewords in the each ordering;
  a lowest decoding probability for a codeword among all codewords in the each ordering;
  a minimal SINR for a codeword among all codewords in the each ordering; and
  a minimal channel gain for a codeword among all codewords in the each ordering.

11. A system for determining a successive interference cancellation (SIC) ordering for a plurality of codewords, the system comprising processing circuitry for:
  mapping, for each ordering of a plurality of SIC orderings of the codewords, an effective channel quality associated with each codeword to a Packet Error Rate (PER) value associated with the each codeword, wherein said mapping is based on a position of the each codeword in the each ordering; and
  selecting, using decoder circuitry, one ordering from the plurality of SIC orderings for decoding the codewords using SIC, wherein said selecting is based on a performance objective computed from the PER value associated with the each codeword.

12. The system of claim 11, further comprising receiver circuitry for receiving the plurality of codewords, wherein said processing circuitry is further configured for:
  identifying the plurality of SIC orderings for the received codewords, wherein each ordering defines a unique order of the received codewords for decoding using SIC; and
  performing said mapping the effective channel quality for the each ordering after receiving the plurality of codewords, based on the identified plurality of SIC orderings.

13. The system of claim 11, wherein said processing circuitry is configured for computing one of the group consisting of a predicted Packet Error Rate (PER) value, a Signal-to-Interference and Noise Ratio (SINR) value, a channel gain, and an achievable data rate for the each codeword.

14. The system of claim 11, wherein said processing circuitry is configured for:
  mapping the effective channel quality associated with the each codeword to an effective stream Signal-to-Noise ratio (SNR) value for each stream of a plurality of streams associated with the each codeword;
  combining effective stream SNR values for the plurality of streams associated with the each codeword to generate an effective codeword SNR value for the each codeword; and
  mapping the effective codeword SNR value to the performance objective associated with the each codeword.

15. The system of claim 11, wherein said processing circuitry is configured for computing a unique performance component for the each codeword at a particular position in the each ordering.

16. The system of claim 15, wherein said processing circuitry is configured for generating a tree of nodes arranged in a plurality of layers associated with respective SIC stages, wherein each node at a particular layer represents the unique performance component for a codeword to be decoded in a SIC stage associated with the particular layer.

17. The system of claim 16, wherein said processing circuitry is configured for:
  generating a first layer of the tree, wherein the first layer comprises a plurality of nodes associated with respective ones of the codewords; and
  generating a child node of the node N, wherein a path from a root node of the tree to the node N comprises at least one path node, and wherein the child node is associated with a codeword other than at least one codeword associated with the at least one path node.

18. The system of claim 15, wherein said processing circuitry is configured for computing a performance component for a codeword in the each ordering in response to determining that the codeword is preceded by a unique partition of codewords in the each ordering.

19. The system of claim 18, wherein said processing circuitry is configured for:
generating a first layer of the tree, wherein the first layer comprises a plurality of nodes associated with respective ones of the codewords;
for a node N of the tree associated with a codeword i, determining if a parent node of the node N is associated with a codeword j where j is larger than i; and
in response to determining that the parent node of node N is associated with a codeword j where j is larger than i, generating a child node of the node N, wherein a path from a root node of the tree to the node N comprises at least one path node, and wherein the child node is associated with a codeword other than at least one codeword associated with the at least one path node.

20. The system of claim 11, wherein the performance objective is based on at least one selected from the group consisting of:
a total throughput for the codewords in the each ordering;
a total decoding probability for the codewords in the each ordering;
a total Signal-to-Interference and Noise Ratio (SINR) for the codewords in the each ordering;
a total channel gain for the codewords in the each ordering;
a minimal throughput for a codeword among all codewords in the each ordering;
a lowest decoding probability for a codeword among all codewords in the each ordering;
a minimal SINR for a codeword among all codewords in the each ordering; and
a minimal channel gain for a codeword among all codewords in the each ordering.

* * * * *